US010457262B2

(12) United States Patent
Sprocq et al.

(10) Patent No.: US 10,457,262 B2
(45) Date of Patent: Oct. 29, 2019

(54) ACTUATING DEVICE OF A BRAKE SYSTEM

(71) Applicant: Robert Bosch GmbH, Stuttgart (DE)

(72) Inventors: Raynald Sprocq, Esbly (FR); Chris Anderson, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 15/735,579

(22) PCT Filed: Jun. 2, 2016

(86) PCT No.: PCT/EP2016/062488
§ 371 (c)(1),
(2) Date: Dec. 11, 2017

(87) PCT Pub. No.: WO2016/202599
PCT Pub. Date: Dec. 22, 2016

(65) Prior Publication Data
US 2018/0297571 A1    Oct. 18, 2018

(30) Foreign Application Priority Data
Jun. 15, 2015   (FR) .................................... 15 55421

(51) Int. Cl.
*B60T 13/74*     (2006.01)
*F16H 25/20*     (2006.01)
*F16D 125/40*    (2012.01)

(52) U.S. Cl.
CPC .......... *B60T 13/745* (2013.01); *F16H 25/20* (2013.01); *B60T 2270/82* (2013.01); *F16D 2125/40* (2013.01)

(58) Field of Classification Search
CPC ..... B60T 13/745; B60T 2270/82; F16H 25/20
See application file for complete search history.

(56) References Cited

U.S. PATENT DOCUMENTS

| 4,653,815 A | 3/1987 | Agarwal et al. |
| 2005/0253450 A1* | 11/2005 | Giering .................. B60T 7/042 303/115.1 |

(Continued)

FOREIGN PATENT DOCUMENTS

EP    1 950 112 A1    7/2008

OTHER PUBLICATIONS

International Search Report corresponding to PCT Application No. PCT/EP2016/062488, dated Aug. 25, 2016 (German and English language document) (5 pages).

*Primary Examiner* — Vishal R Sahni
(74) *Attorney, Agent, or Firm* — Maginot, Moore & Beck LLP

(57) ABSTRACT

An actuating device of a brake system controlled by a brake pedal and/or a brake management system for supplying brake circuits with pressurized brake fluid includes a master cylinder, an electric motor, a ball/nut screw transmission, a nut, a screw, and a free connection rod. The master cylinder is connected to the brake circuits and has a primary piston. The electric motor is controlled for a braking action. The ball nut/screw transmission is configured to transform rotary movement of the electric motor into a translational movement of the primary piston. The nut is blocked from moving in translation, free to rotate, and driven by the electric motor. The screw is free to move in translation but blocked from rotating. The free connection rod is pressed between a base of the primary piston and the screw in order to transmit a thrust of the screw to the primary piston.

17 Claims, 3 Drawing Sheets

(56) References Cited

U.S. PATENT DOCUMENTS

| | | | |
|---|---|---|---|
| 2010/0176652 A1 | 7/2010 | Arakawa | |
| 2012/0073286 A1* | 3/2012 | Takayama | B60T 13/745 60/538 |
| 2013/0197771 A1* | 8/2013 | Takeda | B60T 13/745 701/70 |
| 2014/0326090 A1* | 11/2014 | Kisa | B21D 15/04 74/89.23 |

* cited by examiner

ACTUATING DEVICE OF A BRAKE SYSTEM

This application is a 35 U.S.C. § 371 National Stage Application of PCT/EP2016/062488,filed on Jun. 2, 2016, which claims the benefit of priority to Serial No. FR 15 55421, filed on Jun. 15, 2015 in France, the disclosures of which are incorporated herein by reference in their entirety.

The present disclosure relates to a brake system actuating device controlled by the brake pedal and/or a brake management means such as a driving assistance system for supplying the brake circuits with pressurized brake fluid.

BACKGROUND

Assisted electric brake devices characteristically require a form of transmission that allows the angular movement of an electric motor to be converted into a linear movement in order to apply a force and displace one or several pistons in a hydraulic pressure generator such as a master cylinder.

Ball screw devices are generally considered for applications of this kind. However, the components of this kind of ball screw transmission device are very rigid under load and due to the numerous dimensional tolerances in the system, they do not allow the guide plane of the piston of the master cylinder to be adjusted in its bore to remain within narrow radial tolerances and allow the pressure-generating function to be guaranteed throughout a service life. The extent of the lateral constraints exerted by the piston on the bore and the reactive forces applied to the ball screw transmission cause premature wearing of the transmission and do not allow it to endure effectively and/or guarantee the reliability of the brake system.

SUMMARY

The aim of the present disclosure is to develop a mechanical transmission device for an electric brake system which improves transmission of the movement between the driving motor and the piston (primary piston) of the pressure generator supplying the brake circuit or circuits, such as the single master cylinder or the tandem master cylinder.

To this end, the object of the disclosure is a brake system actuating device controlled by the brake pedal and/or a brake management means for supplying the brake circuits with pressurized brake fluid, comprising: a master cylinder connected to the brake circuits and comprising a primary piston, an electric motor controlled for a braking action, a ball nut/screw transmission for transforming the rotational movement of the electric motor into a translational movement of the piston, the nut which is translationally locked allowing it to move forward in fail-soft mode and rotationally free being driven by the motor, the screw being translationally free but rotationally locked, a free connection rod being pressed between the bottom of the piston and the screw, in order to transmit the thrust from the screw to the piston.

The flexibility of the link or interface between the piston of the master cylinder (the primary piston) and the screw that pushes the primary piston allows all the tilting or parallel offsets of the axis of the screw of the ball screw drive and the axis of the bore of the master cylinder and of its primary piston on which the screw rests to be balanced. This embodiment is particularly simple and does not damage the transmission performance.

The nut which is translationally locked may advantageously move forward in fail-soft mode, which allows braking, even if the motor controlling/assisting with the braking manoeuver is defective. The nut is locked translationally in its rearward direction.

In accordance with another characteristic, the actuating device is characterized in that the free connection rod comprises ball-shaped ends cooperating with a ball-shaped cup realized in the bottom of the piston and a ball-shaped cup realized in the screw, respectively.

This support of the free connection rod by its two ends being ball-shaped in respective cups favors the movement of the free connection rod and its positioning in the most appropriate position between the bottom of the primary piston and the screw.

The screw is very advantageously in the form of a sleeve open on the side oriented towards the piston, the bottom of which is fitted with the ball-shaped cup. This embodiment allows the free connection rod to be held in the sleeve of the screw which is slightly shorter than that of the connection rod, even in the tilting position, such that the sleeve of the thread under no circumstances touches the bottom of the primary piston and does not inhibit the freedom of movement of the screw in relation to the primary piston in the transverse direction with respect to the axis of the bore receiving the primary piston. In effect, as indicated, the sleeve of the screw receiving the connection rod is slightly shorter than the connection rod because its ball on the piston side projects beyond the sleeve, without the sleeve coming into contact with the bottom of the piston.

In accordance with an advantageous characteristic, the screw is attached to the piston by a link in the form of an Oldham coupling between the bottom of the piston and the sleeve of the screw.

This link rotationally couples the screw and the piston, said piston itself being locked rotationally in order to lock the screw rotationally and allow it to be tightened by the nut. This link advantageously allows the possible axial offset of the screw in respect of the axis of the piston to be absorbed.

Following an advantageous characteristic, the link in the form of an Oldham coupling is a link comprising:
  a first diametral guide supported by the bottom of the piston oriented in a first direction passing through the axis of the piston,
  a second diametral guide supported by the end of the sleeve of the screw, oriented in the second direction perpendicular to the axis of the screw and passing through said screw, and
  a transmission component provided with a first complementary axis guide to cooperate in a sliding manner with the first guide, and a second complementary axis guide to cooperate in a sliding manner with the second guide of the screw,
    the two axis directions being orthogonal,
    this transmission component being mounted in a floating manner between the base of the screw on the two guides.

This embodiment has the advantage of combining the cup receiving the ball-shaped end of the connection rod and the orthogonal guidance necessary for the rotational coupling between the piston and the screw, despite any faults in the alignment of the axis of the screw in respect of the axis of the piston of the master cylinder. This embodiment is particularly advantageous, thanks to the particular part formed by the base with the first guide and the cup, a part which crimped to the bottom of the piston. The assembly has a very simple embodiment and fitting.

According to another characteristic, the first guide is a diametral rectangular raised area in direction D1 passing through the axis of the piston and perpendicular thereto, and the first complementary guide of the transmission component is a rectangular housing receiving the first guide in a sliding manner and allowing movement in direction D1.

According to another characteristic, the second guide is a diametral open cutout in the end of the sleeve of the screw and the second complementary guide is formed by two fingers in a diametral orientation position D2 to be housed in the respective slot of the screw.

In summary, the actuating device of the brake system according to the disclosure has the advantage of being a particularly simple embodiment facilitating transmission of the driving movement of the primary piston from the electric assistance motor without restricting the guidance in the primary piston.

BRIEF DESCRIPTION OF THE DRAWINGS

The present disclosure will be described below in a more detailed manner with the help of examples of the brake system actuating device represented in the attached drawings in which.

DETAILED DESCRIPTION

Figure 1:
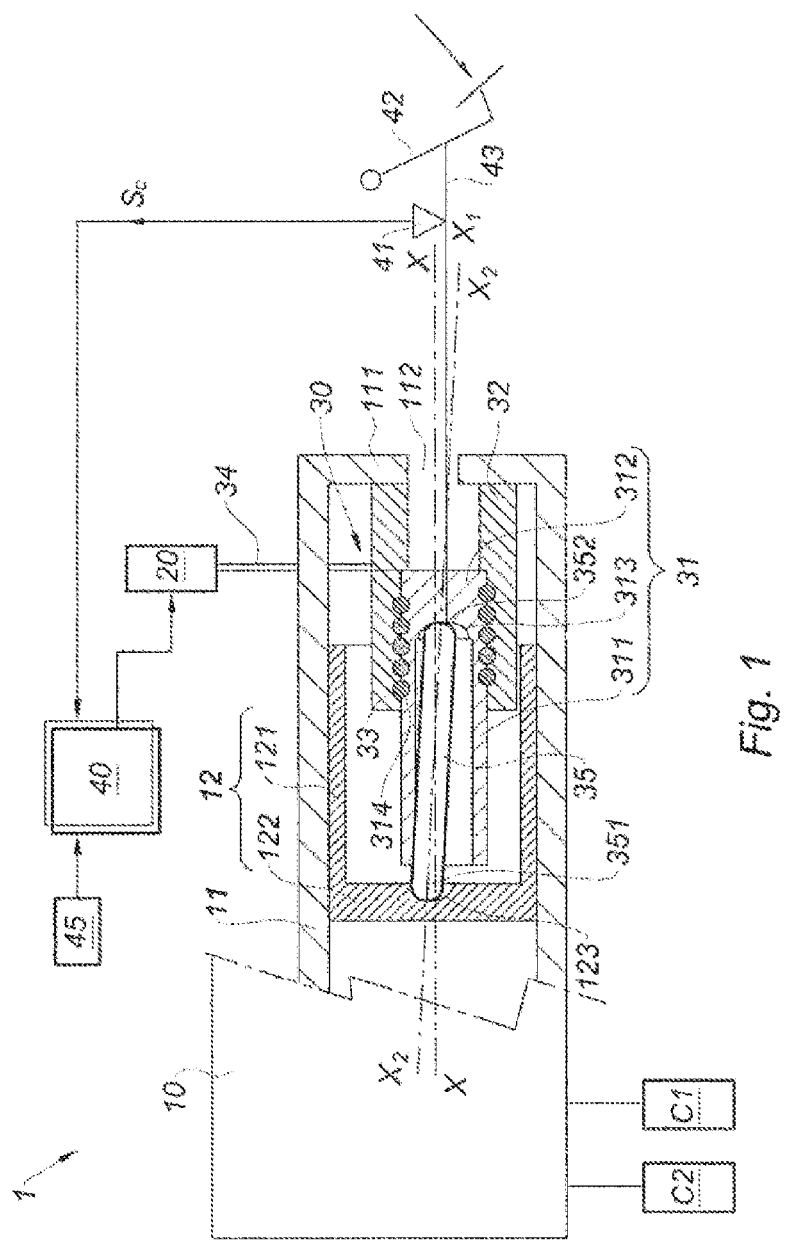
FIG. 1 is a very simplified overall plan, partially through blocks of a brake system actuating system controlled according to the disclosure.

FIG. 1 shows a brake system actuating device 1 according to the disclosure consisting of a master-cylinder 10 supplying pressurized brake fluid to the brake circuits C1, C2, being activated by an electric motor 20 controlled by a control unit 40 according to the braking command of the driver (brake pedal 42) or of the driving assistance system 45 which is, for example, an ESP system. The driver translates their braking command by their action on the brake pedal 42. This action is detected by a sensor 41 transmitting a brake signal SC to the control unit 40 combined with the assistance system 45 to control the electric motor 20.

The master cylinder 10 is only represented schematically by the bore 11 of its cylinder housing the piston (primary piston) 12; in the case of a tandem master cylinder, the secondary piston is not shown.

The piston 12 is normally referred to as the primary piston, although the master cylinder 10 may be a single master cylinder or a tandem master cylinder, in other words a single brake circuit or two brake circuits C1, C2 in parallel.

The axis XX of the bore 11 is also the axis of the piston 12.

The motor 20 drives the piston 12 through a transmission which converts its rotational movement into a translational movement to push the piston 12.

The transmission 30 is a ball screw transmission formed by a rotationally fixed screw 31 engaging with a nut 32 through a ball connector 33.

The screw 31 is locked rotationally either in respect of the piston 12 which is itself locked rotationally or rotationally forced. The screw 31 may likewise be rotationally locked by a mechanical link emerging from the bore 11 through the opening 112 left in the bottom 111 of the cylinder of the bore 11 to allow the actuating rod 43 coming from the brake pedal 42 to pass through and allowing pressure to be placed on the screw 31 itself resting against the primary piston 12 for direct braking in the event of a fault in the braking assisted by the motor 20.

For this emergency braking (fail-soft mode), the nut 32 is translationally free with respect to the bottom 111 of the bore, remaining rotationally integral with the link 34 of the motor 20 which, itself, takes the form of flutes on the outer surface of the nut 32, for example, with the return travel of the nut against the bottom 111 by a spring which is not shown.

The nut 32 driven rotationally by the electric motor 20, by a mechanical link such as a clutch 34, rests against the bottom 111 of the cylinder 11, causing the screw 31, and therefore the piston 12, to move forwards or backwards, said piston itself controlling the possible secondary piston by isostatic compression of the brake fluid, as is known in tandem master cylinders.

The screw 31 rests against the bottom 122 of the piston 12 by means of a connection rod 35, whereof the two ends 351, 352 rest against the bottom 122 of the piston 12 and against the screw 31, respectively.

According to the embodiment, the connection rod 35 has its two ends 351, 352 in a ball shape, coming in a ball-shaped cup 123 formed in the bottom 122 of the piston 12 for the end 351 and for the other end 352, in a cup 313 of the screw 31, respectively. The screw 31 is preferably a hollow screw formed from a sleeve 311 which is open on the side of the piston 12, the bottom 312 whereof is provided with the ball-shaped cup 313 in such a manner that this link through the connection rod 35 allows the inevitable play of the axial offset X1X1 and the axial tilting X2X2 to be absorbed between, on the one hand, the axis XX of the bore 11 of the master cylinder 10 and also the axis of its piston 12 and, on the other hand, the axis X1X1 or X2X2 of the screw 31 of the transmission 30.

FIG. 1 shows schematically the offset between the axis of the offset screw 35 following the axis X1X1 parallel to the axis XX, or even following the axis X2X2 tilted in respect of the axis XX, due to the inevitable play in the construction and driving of the nut 321 by the electric motor 20. The screw 31 preferably formed from the sleeve 311 bears externally the thread 314 of the ball screw link 33. As this sleeve 311 is open on the side orientated towards the bottom 122 of the piston 12, the connection rod 35 is housed on its greatest length in the sleeve 311 and only projects beyond it slightly, since the section of the sleeve 311 beyond the bottom 312 is slightly smaller in length than that of the connection rod 35. Hence, whatever its tilt according to the alignment faults between the piston 12 and the screw 31, the connection rod 35 only slightly exceeds the sleeve 311 with its end 351; in return, whatever the tilting position of the connection rod 35, the sleeve 311 does not touch the bottom 122 of the piston 12 such that the offset of the sleeve 311 has no influence on the accuracy of the transmission of the thrust movement of the screw 31 at the piston 12 of the master cylinder 10.

The actuating device 1 is represented in a highly simplified manner in FIG. 1. It may comprise a single master cylinder or a tandem master cylinder. When combined with the master cylinder, the primary piston 12 pushes with a greater force compared with that applied to the brake pedal 42 and transmitted directly to the screw 31, for example in case of a fault in the actuator; this force is then that applied directly by the brake pedal 42 to the primary piston 12.

The electric motor 20 is activated depending on the braking command from the driver (who pushes the brake pedal 42), the displacement thereof being detected by the sensor 41 or even by the driving assistance system 45, for example the ESP system acting automatically on the central unit 40 according to the requirements and the braking needs. The link through the connection rod 35 uncouples the axis XX of the piston and the axis X1X1 or X2X2 of the screw 31 in such a manner that the inevitable manufacturing and assembly play that may be translated by a parallel offset of the two axes or by the tilting of the axis of the screw 31 in respect of the axis XX of the cylinder 11 and of the piston 12 do not produce non-symmetrical constraints acting on the piston which would not only have a detrimental effect on operation, but would in particular reduce the service life of the master cylinder.

Figure 2:
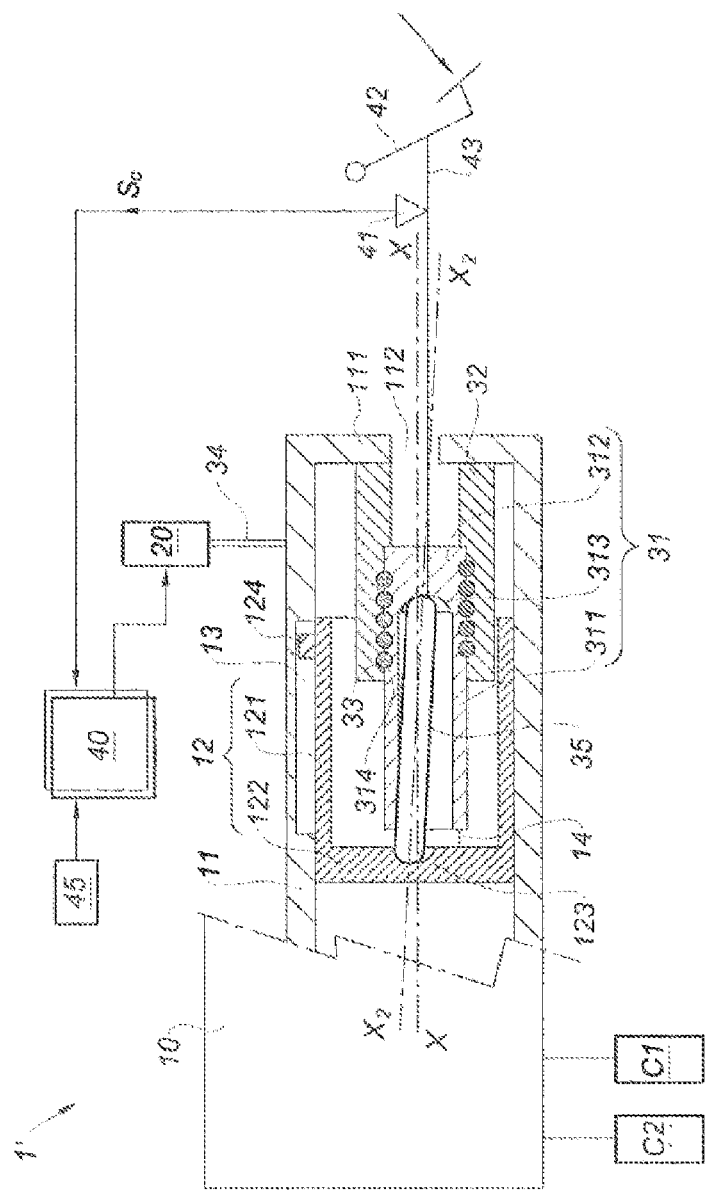
FIG. 2 is a highly simplified plan of a variant of the actuating device in FIG. 1.

FIG. 2 shows a variant of the device 1' to ensure the rotational locking of the primary piston 12 and guarantee the rotational locking of the screw 31. In this embodiment, elements which are identical to those in the embodiment in FIG. 1 have the same reference numbers and their description will not be systematically repeated. As a result, the cylinder 11 on the bore side has a groove 13 to receive a lug 124 which is integral with the primary piston 12. The groove 13 is straight, parallel to the axis XX of the bore 11.

The screw is fixed rotationally in respect of the piston by a link 14 created, for example, by a pin with a fork allowing the axial movement (axis X1X1 or X2X2) of the screw 31 in respect of the axis XX of the piston 12.

Figure 3:
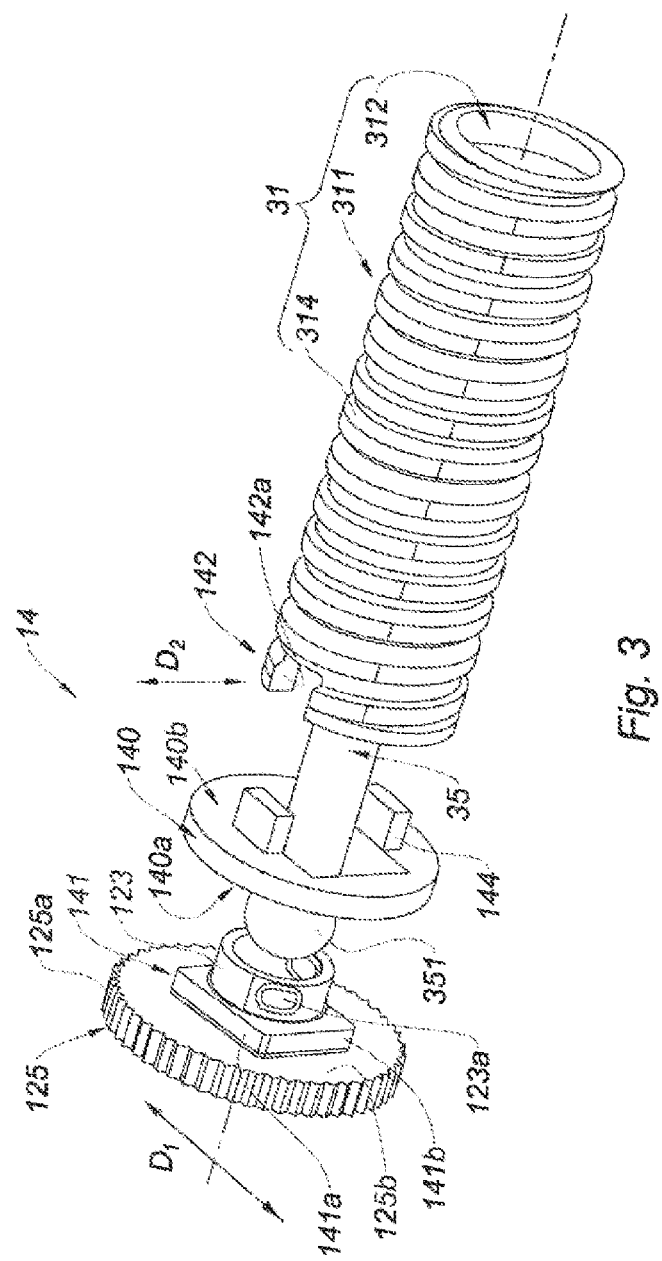
FIG. 3 is an exploded view of a rotationally integral piston/screw link.

FIG. 3 shows an embodiment of the link 14 joining the bottom 122 of the piston 12 (not shown in this FIG. 3) and the screw 31. The link 14 is formed by a base 125 provided with a linking means, a transmission component 140 and a linking means belonging to the screw 31.

The base 125 according to the present embodiment is a part realized in the bottom 122 or attached thereto. It is then realized separately from the piston 31 to be integrated there, for example by crimping.

The base 125 is a part in the form of a plate, the edge 125a whereof is provided with a knurling, for example a straight tooth, to be crimped while being sunk into an appropriately shaped housing in the bottom 12. It has on its face 125b the linking means of the base. This means is the first guide 141 in the form of a rectangular raised area oriented in direction D1. The parallel sides 141a of the guide 141 engage with a complementary guide of the linking component 140. The other two sides 141b form end stops of the path in direction D1, for example.

The base 125 is provided with the cup 123 with recesses 123a for holding the ball-shaped end 351 of the connection rod; when the ball is engaged with the cup 123, these recesses 123a come behind the ball in such a manner as to hold it in the cup.

The cup 123 benefits from the thickness of the first guide 141 and the plate of the base 125.

The linking means of the screw 31 is a second guide 142 made up of two open cutouts 142a in diametrically opposed positions in relation to the axis of the screw 31 and leading out of its sleeve 311 opposite the bottom 312. The two open cutouts 142a form a guide path for the direction D2.

The transmission component 140 is a crown-shaped part crossed by the connection rod 35 and linking the base 125 to the screw 31 to couple them all rotationally, while allowing the axial movement XX/X1X1 already referred to above.

The transmission component 140 has a face 140a turned towards the base 125 with a rectangular housing that does not appear in this figure and forming a first complementary guide for receiving the first guide 141 which will be locked in the direction D2 perpendicular to the direction D1 but translationally free in the direction D1; this possible translation is sufficient to absorb the axial differences without the rectangular housing necessarily being limited; it may be projecting and therefore constitute a slot.

The face 140b turned towards the screw 31 is provided with a second complementary guide formed by two raised fingers 144, in a complementary manner to that of the cutouts 142a of the screw 31 to be housed therein, in a freely sliding manner in direction D2.

The orientations D1 of the slot and D2 of the fingers 144 are orthogonal, in such a manner that the relative orientation of the piston 12 (its base 125) and of the screw 31 is orthogonal. The link 14 acts as an Oldham coupling and allows defects in the alignment of the axes to be absorbed, while coupling the screw 31 and the piston 12 rotationally, in other words thereby allowing the screw 31 to be locked rotationally to allow its translation by the turning nut.

In the above example, the mobile link in direction D1 is formed by a raised section 141 on the base 125 and a hollow section in the face 140a of the transmission component 140. However, the inverse organization, hollow section/raised section, is likewise possible. The same goes for the link between the component 140 and the screw 31.

Generally speaking, the link described above is made up of a first guide 141 supported by the bottom 122 of the piston 12, either realized directly in the bottom or as a connected part, crimped for example. This first guide has a diametral orientation corresponding to a first direction D1 passing through the axis of the piston 12. The link likewise comprises a second guide 142 supported by the end of the sleeve 311 of the screw 31. This second diametral guide is oriented in a second direction D2 passing through the axis of the screw 31 and perpendicular to this axis.

The transmission component 140 of this link 14 is provided with a first complementary, diametral axis guide D1 for sliding cooperation with the first guide 141. It likewise comprises a second complementary 144, diametral axis guide D2 for sliding cooperation with the second guide 142 of the screw. The two directions D1 and D2 are orthogonal and the transmission component 140 mounted in a floating manner between the base 125 and the screw 31 on the two guides 141, 142.

More particularly, and as already indicated, the first guide 141 is a raised section, rectangular in shape, with a diametral orientation in direction D1, and the complementary guide of the transmission component 140 is formed by a rectangular housing or a diametral slot receiving the first guide and allowing the relative sliding movement in direction D1.

The second guide in the example is a diametral open cutout 142 realized in the end of the sleeve 311 of the screw 31, in other words formed by two cutouts in diametral positions. The second complementary guide 144 is formed by two fingers in a diametral orientation position D2 to be housed in the two cutouts 142a of the screw 31.

| REFERENCE NUMBERS | |
|---|---|
| 1 | Braking system actuating device |
| 10 | Master cylinder |
| 11 | Bore |
| 111 | Bottom of the bore |
| 112 | Cover |
| 12 | Piston |
| 121 | Wall |
| 122 | Bottom of the piston |
| 123 | Ball cup |
| 123a | Holding recess |

-continued

| REFERENCE NUMBERS | |
|---|---|
| 124 | Lug |
| 125 | Base |
| 125a | Knurling |
| 125b | Face turned towards the transmission component |
| 13 | Groove |
| 14 | Link |
| 140 | Transmission component |
| 140a | Face turned towards the base 125 |
| 140b | Face turned towards the screw 31 |
| 141 | First transverse guide |
| 142 | Second transverse guide |
| 142a | Open cutout |
| 144 | Second complementary guide of the transmission component 140 |
| 20 | Electric motor |
| 30 | Transmission |
| 31 | Screw |
| 311 | Sleeve |
| 312 | Bottom |
| 313 | Cup |
| 314 | Thread |
| 32 | Nut |
| 33 | Balls |
| 34 | Mechanical link of the motor 20 |
| 35 | Connection rod |
| 351 | End of the connection rod |
| 352 | End of the connection rod |
| 40 | Control unit |
| 41 | Braking command sensor |
| 42 | Brake pedal |
| 43 | Actuating rod |
| 45 | Driving assistance system |
| XX | Bore axis |
| X1X1, X2, X2 | Screw axis |
| C1C2 | Brake circuit |
| D1D2 | Orthogonal directions |

The invention claimed is:

1. A brake system actuating device controlled by a brake pedal and/or a brake management system for supplying brake circuits with pressurized brake fluid, comprising:
   a master cylinder connected to the brake circuits and comprising a primary piston;
   an electric motor controlled for a braking action;
   a ball nut/screw transmission configured to transform a rotational movement of the electric motor into a translational movement of the primary piston;
   a nut which is rotationally free and translationally locked, the nut configured to move forward in a fail-soft mode, and the nut driven by the electric motor;
   a screw translationally free and rotationally locked; and
   a free connection rod pressed between a bottom of the primary piston and the screw, free of any fixed connection, and configured to transmit a thrust from the screw to the primary piston.

2. The brake system actuating device as claimed in claim 1, wherein the free connection rod comprises:
   ball-shaped ends configured to cooperate with a ball-shaped cup formed in the bottom of the primary piston and a ball-shaped cup formed in the screw, respectively.

3. The brake system actuating device as claimed in claim 2, wherein:
   the screw includes a sleeve open on a side oriented towards the primary piston; and
   the sleeve includes a bottom which is fitted with the ball-shaped cup formed in the screw.

4. The brake system actuating device as claimed in claim 3, wherein:
   the sleeve is configured to receive the free connection rod and is slightly shorter than the free connection rod;
   the ball-shaped end configured to cooperate with the ball-shaped cup formed in the bottom of the primary piston projects beyond the sleeve, without the sleeve coming into contact with the bottom of the primary piston.

5. The brake system actuating device as claimed in claim 3, wherein the screw is attached to the primary piston by a link between the bottom of the primary piston and the sleeve of the screw.

6. The brake system actuating device as claimed in claim 5, wherein the link comprises:
   a first diametral guide supported by the bottom of the primary piston and oriented in a first direction passing through an axis of the primary piston;
   a second diametral guide supported by an end of the sleeve of the screw and, oriented in a second direction perpendicular to an axis of the screw and passing through the screw; and
   a transmission component having a first complementary axis guide configured to cooperate in a sliding manner with the first diametral guide, and a second complementary axis guide configured to cooperate in a sliding manner with the second diametral guide of the screw, wherein the first direction and the second direction are orthogonal to each other, and
   wherein the transmission component is mounted in a floating manner between a base of the screw on the first diametral guide and the second diametral guide.

7. The brake system actuating device as claimed in claim 6, wherein:
   the first diametral guide is a diametral rectangular raised area in the first direction configured to pass through the axis of the primary piston and perpendicular to the axis of the primary piston; and
   the first complementary axis guide is a rectangular housing configured to receive the first diametral guide in a sliding manner and allowing movement in the first direction.

8. The brake system actuating device as claimed in claim 6, wherein:
   the second diametral guide is a diametral open cutout in the end of the sleeve of the screw; and
   the second complementary axis guide includes two fingers in a diametral orientation position configured to be housed in the diametral open cutout of the screw.

9. The brake system actuating device as claimed in claim 5, wherein the link is an Oldham coupling.

10. A brake system actuating device controlled by a brake pedal and/or a brake management system for supplying brake circuits with pressurized brake fluid, comprising:
    a master cylinder connected to the brake circuits and comprising a primary piston;
    an electric motor controlled for a braking action;
    a ball nut/screw transmission configured to transform a rotational movement of the electric motor into a translational movement of the primary piston;
    a nut which is rotationally free and translationally locked, the nut configured to move forward in a fail-soft mode, and the nut driven by the electric motor;
    a screw translationally free and rotationally locked; and
    a free connection rod pressed between a bottom of the primary piston and the screw and configured to transmit a thrust from the screw to the primary piston, the free connection rod comprising ball-shaped ends configured to cooperate with a ball-shaped cup formed in the bottom of the primary piston and a ball-shaped cup formed in the screw, respectively.

11. The brake system actuating device as claimed in claim 10, wherein:
the screw includes a sleeve open on a side oriented towards the primary piston; and
the sleeve includes a bottom which is fitted with the ball-shaped cup formed in the screw.

12. The brake system actuating device as claimed in claim 11, wherein:
the sleeve is configured to receive the free connection rod and is slightly shorter than the free connection rod;
the ball-shaped end configured to cooperate with the ball-shaped cup formed in the bottom of the primary piston projects beyond the sleeve, without the sleeve coming into contact with the bottom of the primary piston.

13. The brake system actuating device as claimed in claim 11, wherein the screw is attached to the primary piston by a link between the bottom of the primary piston and the sleeve of the screw.

14. The brake system actuating device as claimed in claim 13, wherein the link comprises:
a first diametral guide supported by the bottom of the primary piston and oriented in a first direction passing through an axis of the primary piston;
a second diametral guide supported by an end of the sleeve of the screw and oriented in a second direction perpendicular to an axis of the screw and passing through the screw; and
a transmission component having a first complementary axis guide configured to cooperate in a sliding manner with the first diametral guide, and a second complementary axis guide configured to cooperate in a sliding manner with the second diametral guide of the screw,
wherein the first direction and the second direction are orthogonal to each other, and
wherein the transmission component is mounted in a floating manner between a base of the screw on the first diametral guide and the second diametral guide.

15. The brake system actuating device as claimed in claim 14, wherein:
the first diametral guide is a diametral rectangular raised area in the first direction configured to pass through the axis of the primary piston and perpendicular to the axis of the primary piston; and
the first complementary axis guide is a rectangular housing configured to receive the first diametral guide in a sliding manner and allowing movement in the first direction.

16. The brake system actuating device as claimed in claim 14, wherein:
the second diametral guide is a diametral open cutout in the end of the sleeve of the screw; and
the second complementary axis guide includes two fingers in a diametral orientation position configured to be housed in the diametral open cutout of the screw.

17. The brake system actuating device as claimed in claim 13, wherein the link is an Oldham coupling.

* * * * *

UNITED STATES PATENT AND TRADEMARK OFFICE
CERTIFICATE OF CORRECTION

PATENT NO. : 10,457,262 B2  
APPLICATION NO. : 15/735579  
DATED : October 29, 2019  
INVENTOR(S) : Raynald Sprocq and Chris Anderson Page 1 of 1

It is certified that error appears in the above-identified patent and that said Letters Patent is hereby corrected as shown below:

In the Claims

In Claim 6, at Column 8, Line 18, delete the "," between the words "and" and "oriented".

Signed and Sealed this  
Eleventh Day of February, 2020

Andrei Iancu  
*Director of the United States Patent and Trademark Office*